US011427971B2

(12) United States Patent
Meherg et al.

(10) Patent No.: US 11,427,971 B2
(45) Date of Patent: Aug. 30, 2022

(54) ARAGONITE BASED GROUND COVERING

(71) Applicant: Calcean Minerals and Materials, LLC, Gadsden, AL (US)

(72) Inventors: Harold Meherg, Wilsonville, AL (US); Anthony Myers, Gadsden, AL (US); Patrick Soon-Shiong, Culver City, CA (US)

(73) Assignees: Calcean Minerals and Materials, LLC, Gadsden, AL (US); Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 17/098,097

(22) Filed: Nov. 13, 2020

(65) Prior Publication Data

US 2021/0180270 A1 Jun. 17, 2021

Related U.S. Application Data

(60) Provisional application No. 62/948,746, filed on Dec. 16, 2019.

(51) Int. Cl.
*E01C 13/08* (2006.01)
*E01C 13/02* (2006.01)

(52) U.S. Cl.
CPC ............ *E01C 13/083* (2013.01); *E01C 13/02* (2013.01)

(58) Field of Classification Search
CPC ......... E01C 13/08; E01C 13/083; E01C 13/02
See application file for complete search history.

(56) References Cited

U.S. PATENT DOCUMENTS

| 3,920,800 | A | 11/1975 | Harris |
| 6,094,860 | A * | 8/2000 | Motz ................. E01C 13/083 |
| | | | 47/58.1 R |
| 6,818,274 | B1 | 11/2004 | Buck et al. |
| 2005/0003193 | A1 | 1/2005 | Stroppiana |
| 2006/0172092 | A1 | 8/2006 | Tetrault |
| 2007/0062331 | A1 | 3/2007 | Havrda et al. |
| 2008/0317978 | A1 | 12/2008 | Smit et al. |
| 2009/0286017 | A1 | 11/2009 | Horio et al. |
| 2010/0055461 | A1 | 3/2010 | Daluise et al. |

(Continued)

FOREIGN PATENT DOCUMENTS

| CN | 102696306 B | 6/2013 |
| DE | 10 2008 039671 A1 | 3/2010 |

(Continued)

OTHER PUBLICATIONS

International Search Report received fro PCT International Application No. PCT/IB2020/060721 filing date Nov. 13, 2020, 4 pages.
(Continued)

*Primary Examiner* — Abigail A Risic
(74) *Attorney, Agent, or Firm* — Martin Fessenmaier; Umberg Zipser LLP

(57) ABSTRACT

Compositions and methods in which aragonite, and especially oolitic aragonite particles are used as infill material in an artificial turf structure or as sub-growth substrate for natural grass. Advantageously, oolitic aragonite particles provide: a superior microporous surface for effective water saturation to impart thermal control and environmental compatibility; ammonia neutralization of urine by reducing urea hydrolysis with the free calcium presented in the aragonite particles; and aragonite particle uniformity allowing for reduced compaction and desirable water draining.

17 Claims, 5 Drawing Sheets

(56) References Cited

U.S. PATENT DOCUMENTS

| | | | | |
|---|---|---|---|---|
| 2010/0279032 A1* | 11/2010 | Chereau | ................ | E01C 13/08 |
| | | | | 428/17 |
| 2011/0135851 A1 | 6/2011 | Dozeman et al. | | |
| 2013/0030123 A1* | 1/2013 | Martin | ................ | E01C 13/08 |
| | | | | 525/95 |
| 2013/0199755 A1* | 8/2013 | Sawafta | ................ | F28D 20/00 |
| | | | | 165/104.11 |
| 2017/0142978 A1 | 5/2017 | Falken | | |
| 2017/0191230 A1* | 7/2017 | Doble | ................ | E01C 13/02 |
| 2017/0233956 A1* | 8/2017 | Hanson, Jr. | ................ | C08K 3/22 |
| | | | | 521/145 |
| 2019/0301107 A1* | 10/2019 | Aldahir | ................ | D04H 1/4334 |
| 2020/0131718 A1* | 4/2020 | Aldahir | ................ | E01C 13/02 |
| 2020/0270821 A1* | 8/2020 | Hanson, Jr. | ................ | C09C 1/025 |

FOREIGN PATENT DOCUMENTS

| | | | |
|---|---|---|---|
| EP | 1 416 009 A1 | 5/2004 | |
| FR | 2 932 196 A1 | 12/2009 | |
| KR | 1020030002177 A | 1/2003 | |
| KR | 101435184 B1 | 8/2014 | |
| WO | 2008/115085 A1 | 9/2008 | |
| WO | 2020/150274 A1 | 7/2020 | |

OTHER PUBLICATIONS

Written Opinion received fro PCT Application Serial No. PCT/IB2020/060721 filing date Nov. 13, 2020, 8 pages.

Extended European Search Report received for European Patent Application Serial No. 20207574.3 dated May 10, 2021, 10 pages.

"Agricultural Uses", Calcean web page, URL: https://web.archive.org/web/20190529032257/http://www.calcean.com/agriculture/, 2019, 3 pages.

International Preliminiary Report on Patentability received for PCT Application Serial No. PCT/IB2020/060721 dated Jun. 30, 2022, 10 pages.

* cited by examiner

PARTICLE SIZE ANALYSIS (ASTM F-1632)

| Lab ID No. | Sample | Soil Separate % | | | Sieve Size/Sand Fraction Sand Particle Diameter % Retained | | | | | |
|---|---|---|---|---|---|---|---|---|---|---|
| | | Sand | Silt | Clay | No. 10 Gravel 2 mm | No. 18 V. coarse 1 mm | No. 35 Coarse 0.5 mm | No. 60 Medium 0.25 mm | No. 100 Fine 0.15 mm | No. 270 V. fine 0.05 mm |
| 30840-1 | SE Bank #1 | 96.8 | 0.4 | 1.6 | 1.2 | 2.3 | 11.4 | 78.7 | 3.8 | 0.1 |
| Guidelines for fairway plating | | <5% | | | 0 - 10 | 0 - 20 | 20 - 50 | 20 - 50 | <15% | <5% |
| | | | | | 0 - 30% combined | | | >60% combined | | |

PARTICLE SHAPE/PARTICLE SIZE PARAMETERS/pH

| Lab ID No. | Sample | Sphericity/Angularity | pH[1] | D85 | Cu | Gradation Index |
|---|---|---|---|---|---|---|
| 30840-1 | SE Bank #1 | Medium to high/well rounded | 9.1 | 0.51 | 1.51 | 2.5 |

1. ASTM D4972, method A. CaCl₂; 25 g sample used. pH in water available on request.

FIG. 2

PHYSICAL PROPERTIES (ASTM F-1815 with water release)

| Lab ID No. | Sample | Bulk Density (g/cc) | Particle Density[1] (g/cc) | Ksat Infiltration (in/hr) | Total Porosity % | Capillary Porosity % | Aeration Porosity (% by volume) at Simulated Profile Depth of:[2] | | | | |
|---|---|---|---|---|---|---|---|---|---|---|---|
| | | | | | | | 8 inches | 12 inches | 16 inches | 24 inches | 39 inches |
| 30840-1 | S.E. Bank #1 | 1.66 | 2.80 | 51.2 | 40.8 | 19.7 | 21.1 | 30.3 | 31.6 | 31.9 | -- |
| Desired | | | | >15 | | | 15 - 30% | | | | |

1. ASMT D5550
2. Determined 20 cm tension (8 inches)

FIG. 3

ARAGONITE BASED GROUND COVERING

This application claims priority to and the benefit of U.S. Provisional Application No. 62/948,746 filed on Dec. 16, 2019, the entire contents of all of which are incorporated herein by reference.

FIELD OF THE INVENTION

The present disclosure relates to compositions, systems, and methods of use of aragonite, and especially oolitic aragonite as infill material for artificial grass/turf, and/or as sub-growth substrate for natural grass.

BACKGROUND OF THE INVENTION

The background description includes information that may be useful in understanding the present disclosure. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Artificial turf has become an increasingly attractive solution for many venues to reduce water consumption, enhance durability, and improve resistance to pet waste. Moreover, in dry conditions, artificial turf provides an 'evergreen' grass-like ground cover. However, mixed artificial grass materials and/or relatively long artificial grass blades require infill materials to stabilize the blades in a substantially natural looking manner and to prevent matting. To that end, several different infills are currently known in the art.

For example, crumb rubber can be used as a filler and is typically produced from recycled tires and so contains a number of known carcinogens. Moreover, due to its black color, the filler material will be very hot when exposed to the sun. Additionally, known rubber-based infill has no significant ammonia neutralization capabilities. Crumb rubber can be coated to render the product more acceptable as described, for example, in EP 1416009 and US 2005/0003193. However, even with coating, numerous undesirable problems remain—in particular, the undesirable heating and the inability to neutralize ammonia from sources such as urine. Still further, crumb rubber has been suspected to leach toxic chemicals into waterways posing a risk to the environment, animals, and humans.

To avoid potential difficulties with environmental toxicity, silica sand can be used as infill material. Most silica sand is rough and angular in shape, resulting in compaction under pressure, which ultimately will compromise drainage capability. Moreover, most silica sand fillers are prone to dust formation upon installation and use, which may lead to silicosis. In addition, silica sand is known to heat up to undesirably high temperatures under sun exposure. While ceramic materials have been used instead of silica sand as disclosed in U.S. Pat. No. 6,818,274, dust formation is still problematic, and neither silica sand nor ceramics have ammonia neutralization capabilities.

Alternatively, various organic materials can be used to circumvent issues associated with dust formation. For example, WO2008/115085 discloses composite filler materials comprising coconut shell, matured coconut husk, young coconut shell, young coconut husk, Manila hemp, lignin and cassava. Such materials may further be coated with antimicrobial agents as described in US 2010/0055461. Unfortunately, even with a coating, nut-based fillers may trigger allergic reactions and are still prone to dust formation.

Temperature control of infill materials can be attempted with water-filled superabsorbent materials such as polyacrylamide or polyacrylate as described in US 2006/0172092. Unfortunately, these materials are typically mechanically unstable and require replacement or refill. Alternatively, hollow cylindrical infill material has been used as described in US 2009/0286017, but these materials are typically subject to compaction over time. Still other polymeric fillers are shaped as hollow spheres to provide shock absorption as disclosed in US 2011/0135851. While such materials avoid at least some of the problems noted above, most or all of them still lack environmental compatibility and ammonia neutralization capabilities. As such, compaction, proper disposal, and/or pet waste remain significant issues.

Thus, even though various infill materials for artificial turf are known in the art, all or almost all of them suffer from various disadvantages. Consequently, there is a need to provide improved compositions and methods for infill materials for artificial turf which are at least environmentally friendly infill materials that resist compaction, provide desirable thermal control, and enable ammonia neutralization.

SUMMARY OF THE INVENTION

The inventors have now discovered that aragonite, and especially microporous oolitic aragonite can be used as an infill material for artificial turf that is environmentally friendly, resists compaction, provides desirable thermal control, and enables ammonia neutralization. Moreover, as oolitic aragonite is relatively heavy, it will weigh down artificial grass effectively. Moreover, and as is shown in more detail below, the inventors have observed that oolitic aragonite is approximately 20 degrees Fahrenheit cooler than typical infill material and advantageously provides ammonia neutralization properties without toxicity or dusting.

The inventors contemplate a groundcover that comprises a plurality of turf fibers coupled to a backing to form an artificial turf structure, and microporous oolitic aragonite particles disposed between the turf fibers. Most preferably, the aragonite particles comprise oolitic aragonite, which may be processed to a desired size or size rage (e.g., micronized oolitic aragonite). Thus, in some embodiments the aragonite particles may have an average size of less than 1 mm, or may have an average size of between 250 micrometer and 500 micrometer. It is further generally preferred that the aragonite particles will have a surface area of at least 0.9 $m^2/g$, or at least 1.2 $m^2/g$, or at least 1.5 $m^2/g$. Additionally, the microporous oolitic aragonite particles have a uniformity constant of between about 1.2 to about 1.8.

Additionally, the at least some of the aragonite particles may be colored and/or comprise an antimicrobial agent (e.g., via coating or impregnation). Further contemplated aragonite particles comprise water or are even water saturated (particularly to control temperature). Therefore, in other embodiments the backing may have drainage holes or comprises a water permeable material.

Consequently, the inventors also contemplate a method of reducing temperature excursions of an artificial turf structure that includes the steps of providing an artificial turf structure that comprises a plurality of turf fibers coupled to a backing, and at least partially filling a space between the turf fibers with a plurality of aragonite particles to thereby reduce temperature excursions as compared to the artificial turf structure with a silica filler. For example, such methods may reduce the temperature excursion by at least 10, or at least 20° F.

Similarly, the inventors contemplate a method of neutralizing ammonia from urine in an artificial turf structure that includes a step of providing an artificial turf structure that comprises a plurality of turf fibers coupled to a backing, and another step of at least partially filling a space between the turf fibers with a plurality of microporous oolitic aragonite particles, where advantageously, the microporous oolitic aragonite particles provide reactive calcium to thereby suppress ammonia volatilization from urea hydrolysis.

Viewed from yet another perspective, the inventors also contemplate a method of reducing compaction, wrinkling, or matting of an artificial turf structure that includes a step of providing an artificial turf structure that comprises a plurality of turf fibers coupled to a backing, and another step of at least partially filling a space between the turf fibers with a plurality of aragonite particles to thereby reduce compaction or matting as compared to the artificial turf structure with a silica filler. For reduced compaction, in some embodiments, the microporous oolitic aragonite particles have a uniformity constant of between about 1.2 to about 1.8. Preferably, the microporous oolitic aragonite particles have a uniformity constant of between about 1.4 to 1.6.

In yet a further aspect of the inventive subject matter, the inventors also contemplate a method of enhancing water drainage of an artificial turf structure that includes a step of providing an artificial turf structure that comprises a plurality of turf fibers coupled to a backing, and another step of at least partially filling a space between the turf fibers with a plurality of oolitic aragonite particles to thereby enhance water drainage as compared to the artificial turf structure with a silica filler. In some embodiments, the enhanced drainage includes an artificial turf made with a plurality of microporous oolitic aragonite particles having an aeration porosity of between about 15% to about 30% at depth of about 6 inches to about 8 inches, and/or a saturation constant ($K_{sat}$) of at least 50 in/hr.

In at least some embodiments of contemplated methods, it is preferred that the aragonite particles are contacted or even saturated with water. Moreover, and most typically, the aragonite particles comprise oolitic aragonite, which may be micronized to a desired size. For example, suitable microporous oolitic aragonite particles may have an average size of between 250 micrometer and 500 micrometer. Furthermore, contemplated microporous oolitic aragonite particles may have a surface area of at least 0.9 m$^2$/g, or at least 1.2 m$^2$/g, or 1.5 m$^2$/g. Additionally or alternatively, the microporous oolitic aragonite particles have a uniformity constant of between about 1.2 to about 1.8, and a saturation constant ($K_{sat}$) of at least 50 in/hr.

In still another contemplated aspect of the inventive subject matter, the inventors contemplate a method of building a natural grass landscape that includes a step of providing or laying down a sub-growth substrate for natural grass that comprises a plurality of aragonite particles, and a further step of depositing and/or growing turf or topsoil with grass seed onto the sub-growth substrate. Where desired, drainage conduits may be installed within the sub-growth substrate to assist proper drainage.

Various objects, features, aspects, and advantages will become more apparent from the following detailed description of preferred embodiments, along with the accompanying drawing in which like numerals represent like components.

BRIEF DESCRIPTION OF THE DRAWING

FIG. 2 depicts exemplary results for particle size and shape analysis of oolitic aragonite used herein.

FIG. 3 depicts exemplary results for selected physical properties of oolitic aragonite used herein.

DETAILED DESCRIPTION

The inventors have now discovered that aragonite, and particularly oolitic aragonite will provide numerous benefits over conventional filler materials when used in ground covers. Most significantly, oolitic aragonite provided superior drainability, cooling (via reflectivity and water evaporation properties), dimensional stability in a layer (as oolitic aragonite will not significantly compact), and ammonia neutralization capabilities (which is especially desirable where pet or other animal waste is present).

While not limiting to a particular theory or hypothesis, the inventors contemplate that these and other advantages of oolitic aragonite are at least in part attributable to the unique character of aragonite. More specifically, oolitic aragonite is typically spherical and highly microporous, thus endowing exceptional drainage capabilities to the material. In addition, oolitic aragonite also has an extremely high surface area of about 1.7 m$^2$/g (125,000 in$^2$/in$^3$), which means the maximum area to promote the neutralizing of ammonia and cooling effect.

Figure 1:
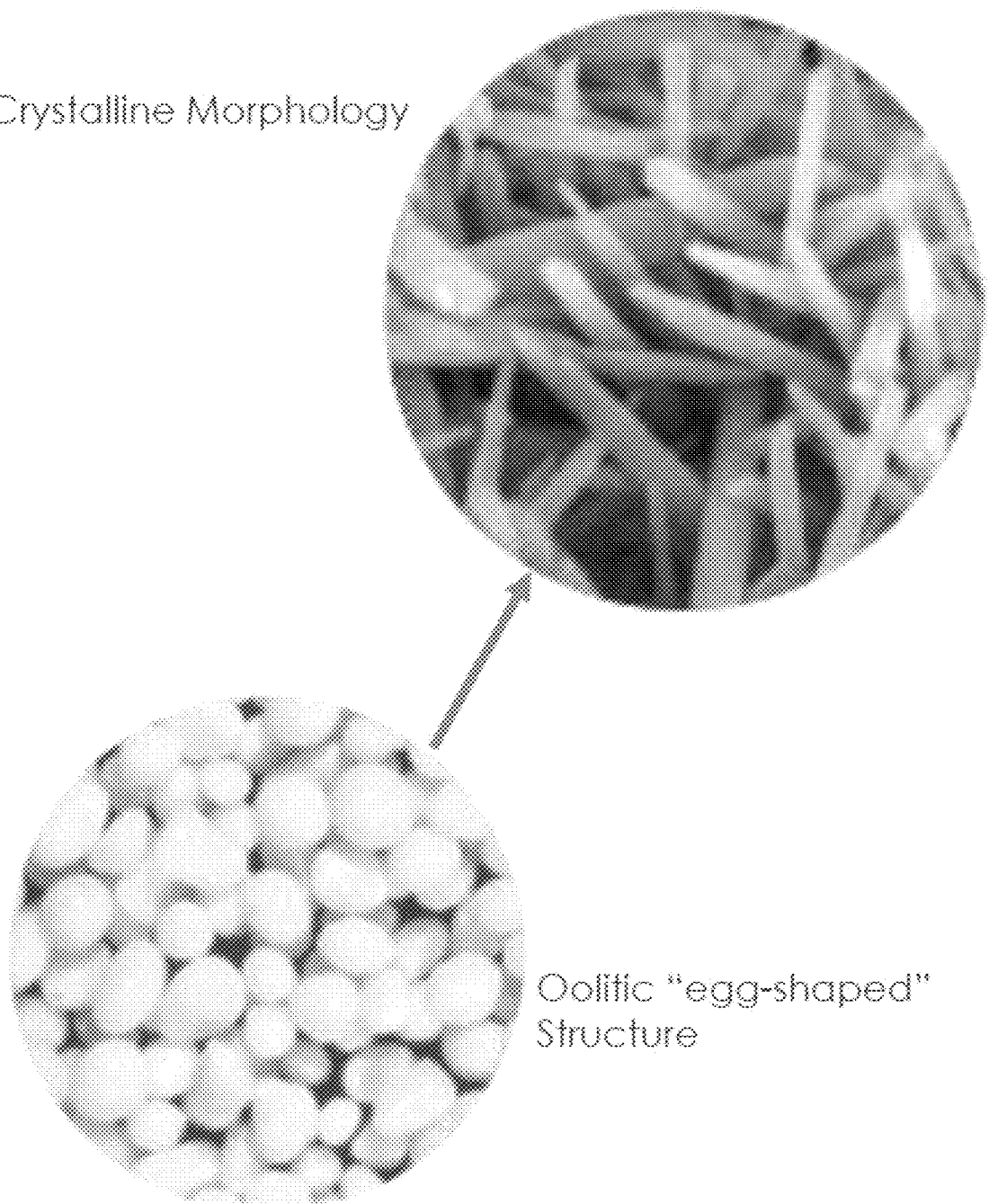
FIG. 1 depicts a photograph and an exemplary SEM image of oolitic aragonite.

Moreover, it should be appreciated that aragonite is not only a non-toxic natural product, but is also a sustainable resource. Oolitic aragonite is generated through the chemical fixation of Carbon Dioxide ($CO_2$) to the naturally present Calcium ($Ca^{2+}$) in the ocean's water, which results in the precipitation of Calcium Carbonate ($CaCO_3$). This process is fueled by the photosynthesis within the blooms of phytoplankton; picoplankton: specifically cyanobacteria and unicellular green algae as they drift across the warm water banks of the Bahamas. Cyanobacteria have a Carbon Dioxide Concentrating Mechanism (CCM) that raises the concentration of $CO_2$ at the site of the carboxylating enzyme ribulose bisphosphate carboxylase (RUBISCO) by up to 1,000 times the surrounding medium. In addition, cyanobacteria excrete organic polymeric substances to form extracellular formations. These Exopolymeric Substances (EPS) serve as a nucleation surface for mineralization, accelerating the calcium carbonate generation process. The combination of the CCM and the presence of the EPS within the surrounding medium of the warm shallow waters of the Bahamas which are already supersaturated with the element Ca' and carbonate anions (Ca$^{++}$ concentrations are at over 10 millimolar) readily result in the phenomenon of "Whitings", cloudy precipitation of oolitic aragonite (CaCO$_3$) with a unique crystal morphology. This process continually produces millions of tons per year of oolitic aragonite within the Bahamas. FIG. 1 is an exemplary photograph of the macroscopic appearance of oolitic aragonite, and further shows a SEM image of the crystalline morphology at high magnification.

In one exemplary contemplated use where aragonite is employed as an infill for artificial turf, oolitic aragonite is dried and screened to a consistent gradation of 10 mesh to +30 or +40 mesh. The so obtained aragonite is then combined with artificial and turf grass to provide weight, to keep the synthetic grass fibers upright, to provide cooling properties and ammonia neutralization capabilities. While oolitic aragonite is typically used as described above, the aragonite can be further processed prior to use. Among other processes, aragonite may be reduced in size (e.g., micronized an average particle size of less than 1 mm, or equal or less than 500 micrometer, or equal or less than 300 micrometer, or equal or less than 100 micrometer, or equal or less than 50 micrometer, or equal or less than 25 micrometer), colored with one or more dyes or pigments, coated or otherwise treated with antimicrobial agents and/or scented agents, or impregnated or coated with one or more agriculturally relevant agents or chemicals (e.g., fungicide, insecticide, herbicide, fertilizer, etc.). Still further contemplated modifications include restructuring of aragonite as is described in WO 2020/150274 (U.S. 62/792,735), which is incorporated by reference herein. Likewise, the aragonite may also be reduced in size while retaining its oolitic shape, typically using a ball mill process. Thus, suitable milled aragonite may include oolitic aragonite having an average particle size of between 5-20 micrometer, or between 20-50 micrometer, or between 50-200 micrometer, or between 200-500 micrometer, or between 500-700 micrometer. NMOtably, such micronized particles will still retain the benefits as noted herein and described in more detail below.

With respect to the cooling effect of oolitic aragonite it should be appreciated that the microporosity present in the ooids (each particle grain) will help trap water, which in turn acts like suspended water droplets with very high surface area, creating mini-natural air conditioning cooling units as wind passes over or through them. Moreover, the color of oolitic aragonite is close to white, resulting in a highly reflective surface while scattering light multi-directionally due to the crystalline morphology of the aragonite surface crystals as can be seen in FIG. 1. Notably, milling oolitic aragonite will produce an even whiter product as compared to raw oolitic aragonite. Preliminary tests of milled aragonite as an infill with artificial grass have shown that the temperature of the so filled artificial grass was approximately 20 degrees Fahrenheit cooler than standard infill based on silica sand. Typically, the temperature excursion of the ground cover made of artificial turf and microporous oolitic aragonite particles upon exposure to sun is 20 degrees cooler than artificial turf with silica sand or without infill. For example, the temperature excursion of the ground cover made of artificial turf and microporous oolitic aragonite particles is about 10 to 20 degrees (F.) cooler. More typically, the temperature excursion of the ground cover made of artificial turf and microporous oolitic aragonite particles is 10, 11, 12, 13, 14, 15, 16, 17, 18, 19, or 20 degrees F. cooler than a ground cover made with the same artificial turf without infill or made with silica sand.

Notably, the total porosity of the microporous oolitic aragonite particles is desirable. Typically, aeration porosity is made up of relatively large pores that conduct water under saturated conditions. When drained, they are filled with air, providing the oxygen that is necessary for root growth. The capillary porosity is made up of small pores that hold water against the force of gravity, retaining much of it for plant use. Ideally, a root zone mix would contain a nearly equal distribution of air and water filled pore space after free drainage. In typical embodiments, the aeration porosity of the microporous oolitic aragonite particles is of between about 15% to about 30%. For example, the aeration porosity of the microporous oolitic particles is about 15%, 20%, 21%, 22%, 23%, 24%, 25%, 26%, 27%, 28%, 29%, or 30%.

In addition, it should be noted that oolitic aragonite and micronized/milled oolitic aragonite had also a remarkable dimensional stability. Indeed, the oolitic aragonite particles and the micronized/milled oolitic aragonite particles had a uniformity coefficient (Cu) of about 1.51, which is typically regarded a uniformly graded sand that contains particles of the same size and hence more volume of voids. Typically, the disclosed oolitic aragonite particles (e.g., micronize/milled oolitic aragonite particles) have a Cu that does not exceed 1.8. For example, the the oolitic aragonite particles have a Cu of or between about 1.2 to about 1.8. More typically, the oolitic aragaonite particles have a Cu that does not exceed 1.6. For example, the oolitic aragonite particles have a Cu of or between about 1.2 to about 1.6. Most typically, the oolitic aragonite particles have a Cu of or between about 1.2, 1.25, 1.3, 1.35, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.65, 1.70, 1.75, or 1.80. Preferably, the oolitic aragonite particles have a Cu of or between about 1.4 to about 1.55. Most preferably, the oolitic aragonite particles have a Cu of 1.45, 1.46, 1.47, 1.48, 1.49, 1.5, 1.51, 1.52, 1.53, 1.54, or 1.55. The uniformity of the oolitic aragonite particles results not only in significantly reduced compaction or even no measurable compaction, but also in very high hydraulic conductivity (water movement) through a layer formed by the aragonite. In other words, aragonite ooids are generally smooth and round in structure, unlike the angular and rough surface of silica sand. The desirable uniformity coefficient (Cu) of aragonite allows for a maximum number of particles of the same size which together with the increased volume of voids between the particles (which are substantial factors in both drainage and compaction), the disclosed oolitic aragonite does not compact under pressure like angular sands (silica). Indeed, the saturation constant ($K_{sat}$) of oolitic aragonite was measured to be at least 50 inches per hour (in/hr), indicating excellent drainage capabilities. Preferably, the $K_{sat}$ of the oolitic aragonite particles (e.g., micronized/milled oolitic aragonite particles) is about 45, about 46, about 47, about 48, about 49, about 50, about 51, about 52, about 53, about 54, about 55, about 56, about 57, about 58, about 59, about 60, about 61, about 62, about 63, about 64, about 65, about 66, about 67, about 68, about 69, or about 70 in/hr. More preferably, the $K_{sat}$ of the oolitic aragonite particles is of from about 50 in/hr to about 60 in/hr. For example, the $K_{sat}$ of the oolitic aragonite particles is about 50, 51, 52, 53, 54, 55, 56, 57, 58, 59, or 60 in/hr.

Moreover, the inventors discovered that oolitic aragonite also provided excellent neutralization of ammonia smell, typically due to decomposition of urea found in human, livestock, and pet urine. Urine commonly has a pH of 4.8 to 8.0 and contains urea (CO(NH$_2$)$_2$). Hydrolysis of urea results in the formation of ammonia and ammonium molecules, causing the undesirable urine smell. Oolitic aragonite has high levels of exchangeable calcium ($Ca^{2+}$), which can offset the pH increase caused by urea hydrolysis and as such prevents or reduces the volatilization of the ammonia molecules. As such, artificial turf and lawn products with oolitic aragonite infill will not only have a higher durability and resist wrinkling and matting, but also reduce or even entirely prevent malodors due to animal urine decomposition.

Additionally, the inventors also contemplate reduction of urea volatilization losses via application of oolitic aragonite at the time of fertilizer application. Here, all top-dressed ammonia- and ammonium-based nitrogen (N) fertilizers can volatilize. The greatest potential to volatilize lies with urea and fluids containing urea such as urea-ammonium nitrate (UAN; 28-0-0 or 32-0-0). This volatilization can result in extra expenses due to lost fertilizer, insufficient fertilizer application resulting in lower yields, and on a larger scale increased industrial nitrogen fixation which has global implications for the environment. Any technology that has the potential to reduce the amount of volatilization losses represents a potential benefit to farmers and the environment in general.

More specifically, urea is hydrolyzed by reacting with water and a $H^+$ ion, leading to the production of two molecules of ammonium and a single bicarbonate ion. Ammonium exists in equilibrium with ammonia that is directly related to the pH of the solution. Low pH favors ammonium and high pH favors ammonia which is available for volatilization. Notably, the pH of the solution is raised by the adsorption of the $H^+$ ion during urea hydration. The increase in soil pH can result in $NH_3$ volatilization from soils with an initial pH as low as 6.5. Soils with high Cation Exchange Capacity often have high levels of exchangeable calcium ($Ca^{2+}$), which can offset the pH increase caused by urea hydrolysis as shown in the equation below.

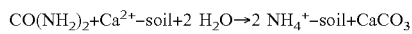

$$CO(NH_2)_2 + Ca^{2+}\text{-soil} + 2\ H_2O \rightarrow 2\ NH_4^+\text{-soil} + CaCO_3$$

Unlike typical urea hydrolysis, when it occurs in the presence of free $Ca^{2+}$, it does not use $H^+$ and thus does not raise pH as long as there is sufficient exchangeable Ca in the system. Not only does it minimize the pH increase, but it also opens two sites on clay particles for $NH_4^+$ to bind to, further decreasing $NH_4^+$ in solution and the potential for $NH_3(g)$ volatilization. Addition of oolitic aragonite to this process will provide the free calcium ions that will be required for the above reaction. It may also push the equilibrium of the reaction to the left thus reducing the potential for volatilization by reducing the hydrolysis of urea itself. Therefore, when oolitic aragonite is used in a material subject to urine contact (e.g., artificial turf, bedding in chicken houses, diapers, playground sand, etc.) the effluent ammonia is significantly reduced.

In view of the above the inventors also contemplate use of aragonite in a sub-growth substrate for natural grass where a base layer of (milled) oolitic aragonite is employed as a drainage layer as well as a retention layer for fertilizer. As such, the aragonite layer will maintain a higher pH without the constant addition of chemicals. Indeed, aragonite holds the highest pH of any gravel or sand and has up to 30 times the buffering capacity of Dolomite, Calcite, or Oyster shell. In addition, and unlike commonly known substrates, aragonite will not require any replacement, buffering the soil for the life of placement. Moreover, as disclosed herein, the $K_{sat}$ values for hydraulic conductivity were above 50 in/hr, indicating excellent drainage capabilities. Still further, it should be noted that the oolitic aragonite can be readily spread in most mechanical spreaders due to both the uniformity in size and quick moisture conductivity.

Aragonite can also act as a high capacity bio-filter. Aragonite is extremely porous, with about 20,000 square inches of surface area per cubic inch. This is why aragonite also has significant capability in reducing nitrates, nitrites, and ammonia, allowing a bio-load many times greater than other substrates. Finally, aragonite has also a high adsorption capability. There are three main parameters that define the adsorptive capacity of oolitic aragonite. These are (1) solubility and buffering capacity, (2) zeta potential (surface charge), and (3) surface area and void ratio.

Examples

Oolitic aragonite was analyzed for particle size distribution and particle shape, and exemplary results are provided in FIG. 2. As can be readily seen, the material was very uniform in particle size, with most of the particles falling into the medium size fraction. The uniformity of the particle size is illustrated by the uniformity coefficient (Cu). Indeed, the aragonite material had a particle size distribution that was substantially more uniform than typical other silica based materials. Moreover, the particle shape was determined to be mostly rounded. Selected physical properties of the aragonite sample, as determined on compacted cores, are shown in FIG. 3.

The total porosity was desirable in the sample. Typically, aeration porosity is made up of relatively large pores that conduct water under saturated conditions. When drained, they are filled with air, providing the oxygen that is necessary for root growth. The capillary porosity is made up of small pores that hold water against the force of gravity, retaining much of it for plant use. Ideally, a root zone mix would contain a nearly equal distribution of air and water filled pore space after free drainage.

Figure 4:
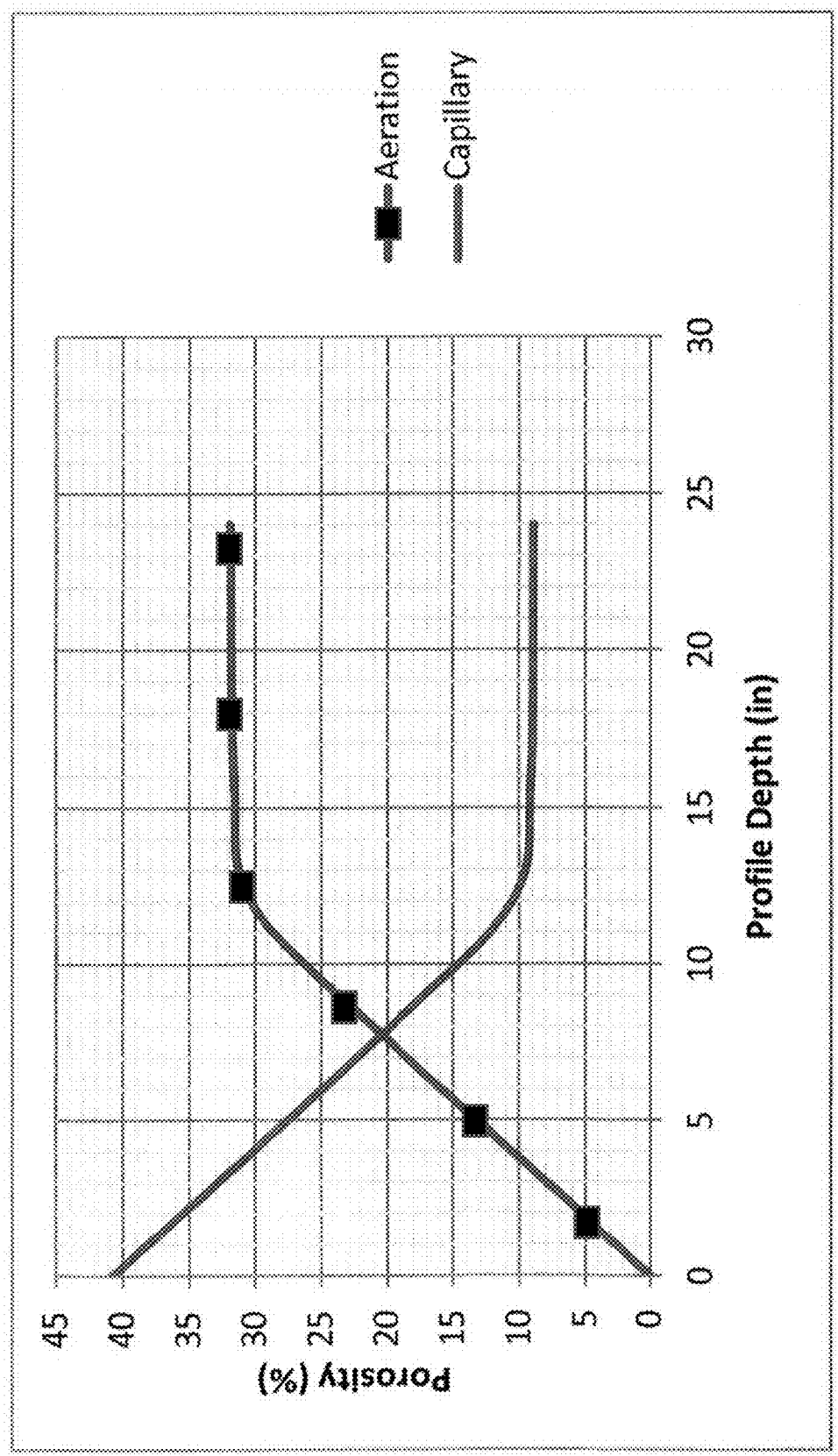
FIG. 4 depicts exemplary simulated aeration and capillary results of oolitic aragonite used herein.

The inventors performed a water release curve on the sand sample. In a sand or sand based mix profile, the deeper the profile depth the greater the aeration porosity will be because of a greater hydraulic head or pressure. The inventors applied increasing levels of energy to the sample to extract water from it, simulating varying depths of sand. By doing this, the inventors can identify a minimum plating depth that will provide desirable physical properties. The inventors identified this minimum depth by the point (depth) at which the inventors obtained a minimum aeration porosity of 15% by volume with an optimum being the point where the aeration and capillary porosity curves intersect. The graph in FIG. 4 shows the aeration and capillary porosity values at different simulated depths. As can be clearly seen, the sample had an aeration porosity of 15% at a depth of about 6 inches with an optimum depth of 8 inches. Plating the sand at a depth less than the minimum would run the risk of the sand retaining too much water at the expense of air.

Figure 5:
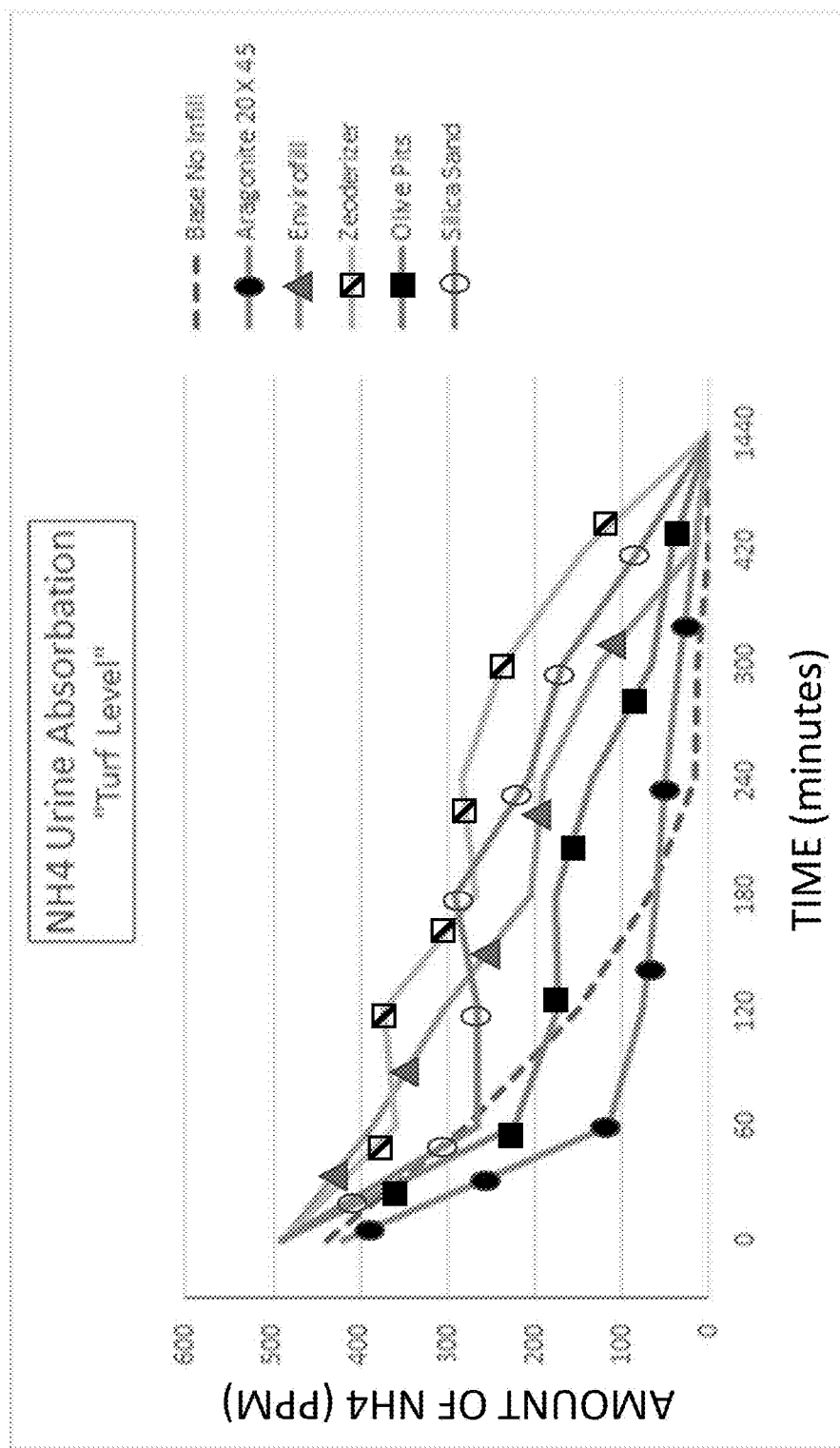
FIG. 5 depicts exemplary results of the amount of ammonium (NH4+) in parts per million (PPM) measured over 7 hours (420 minutes) at indicated timepoints in artificial turf compositions made with no infill, aragonite infill as disclosed herein, Envirofill®, Zeoderizer, Olive Pits, and Silica Sand, as indicated.

With reference to the graph in FIG. 5, neutralization of ammonia was assayed using artificial turf with aragonite infill compared to no infill and other infill products. As indicated in FIG. 5, the tested products were: (1) Baseline—No infill; (2) Calcean (2 lbs/sf), Aragonite 10×30 mesh product; (3) Envirofill® (2 lbs/sf)—16×30 mesh acrylic coated sand; (4) Zeoderizer—(2 lbs/sf); (5) Olives (1.5 lbs/sf)—Grinded olive pits; and (6) Silica Sand—(2 lbs/sf). The collected information was qualified by measuring the amount of ammonium ($NH_4$) in ppm present in the ambient environment above the artificial turf after each of the artificial turf samples were injected with coyote urine. More specifically, 2.5 lbs of the indicated infill (or no infill for Baseline) was added to each 12"×12" piece of artificial turf. The infill was spread over the respective turf piece and allowed to settle. Each artificial turf piece with infill was dosed with 20 ml of coyote urine with each turf being placed under a fume hood. The ammonia meter was positioned 12" above the test turf, and readings were collected every hour for 7 hours (420 minutes). Readings were also taken at 24 hours as necessary to determine when the ammonia had stabilized within the sample.

As shown in FIG. 5, the artificial turf with the aragonite infill was capable of neutralizing the ammonia at a faster rate compared to the artificial turf with no infill, the Envirofill®, the (4) Zeoderizer infill, the Olive pits infill, and the Silica Sand infill.

Materials/Equipment Used: Laboratory fume hood, Ammonia Meter (FD Model NH3000), Stand for Meter, Artificial Turf, Infill Material, Coyote Urine, 10 cc syringe, The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the full scope of the present disclosure, and does not pose a limitation on the scope of the invention otherwise claimed. No language in the specification should be construed as indicating any non-claimed element essential to the practice of the claimed invention.

It should be apparent to those skilled in the art that many more modifications besides those already described are possible without departing from the full scope of the concepts disclosed herein. The disclosed subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A groundcover, comprising:
a plurality of turf fibers coupled to a backing to form an artificial turf structure; and
aragonite particles disposed between the turf fibers;
wherein the aragonite particles are microporous oolitic aragonite particles having a surface that scatters light in multiple directions.

2. The ground cover of claim 1, wherein the aragonite particles comprise micronized oolitic aragonite.

3. The ground cover of claim 1, wherein the aragonite particles have an average size of less than 1 mm.

4. The ground cover of claim 1, wherein the aragonite particles have a surface area of at least 1.5 m$^2$/g.

5. The ground cover of claim 1, wherein at least some of the aragonite particles are colored and/or comprise an antimicrobial agent.

6. The ground cover of claim 1, wherein the aragonite particles have a saturation constant ($K_{sat}$) of at least 50 in/hr.

7. The ground cover of claim 1, wherein the backing has drainage holes or comprises a water permeable material.

8. The ground cover of claim 1, wherein the aragonite particles have a uniformity constant of between about 1.2 to about 1.8.

9. The ground cover of claim 1, wherein the groundcover has an aeration porosity of between about 15% to about 30% at depth of about 6 inches to about 8 inches.

10. A method of reducing temperature excursions of an artificial turf structure, comprising:
providing an artificial turf structure that comprises a plurality of turf fibers coupled to a backing; and
at least partially filling a space between the turf fibers with a plurality of microporous oolitic aragonite particles;
wherein the aragonite particles are micronized oolitic aragonite particles having a surface that scatters light in multiple directions and are present in an amount effective to reduce temperature excursions of the artificial turf structure as compared to the same artificial turf structure with a silica filler.

11. The method of claim 10, wherein the temperature excursion is reduced by about 10° F. up to about 20° F. as compared to the silica filler.

12. The method of claim 10, wherein the aragonite particles have a uniformity constant of between about 1.2 to about 1.8.

13. The method of claim 10, wherein the aragonite particles have a saturation constant ($K_{sat}$) of at least 50 in/hr.

14. The method of claim 10, wherein the aragonite particles have an average size of between 250 micrometer and 500 micrometer.

15. The method of claim 10, wherein the aragonite particles have a high microporosity, caused by the unique crystalline morphology (orthorhombic), and high surface area, approximately 1.82 square meters per gram, both of which aid in trapping moisture internally and allowing evaporative cooling within the particles thus by the nature of the aragonite's infill between the blades of synthetic turf the aragonite lowers the artificial synthetic turf temperature.

16. The method of claim 10, wherein the aragonite particles are classified and or micronized particles having a uniform graded sizing between 150 microns and 850 microns with a uniform ooid shape thus evenly and uniformly distributing into the synthetic artificial turf making the application process simpler and quicker than other forms of artificial turf infill.

17. The method of claim 10, wherein the aragonite particles are classified and or micronized particles having a uniform graded sizing between 150 microns and 850 microns with a uniform ooid shape thus stacking within the artificial synthetic turf in a manner which helps to disperse impact energy in a manner which aids in the reduction of sports injury, as in scrapes and bruises.

\* \* \* \* \*